United States Patent
Santoso et al.

(10) Patent No.: US 8,843,295 B2
(45) Date of Patent: Sep. 23, 2014

(54) ETHANOL CONTENT DETERMINATION SYSTEMS AND METHODS

(75) Inventors: Halim G. Santoso, Novi, MI (US); Audley F. Brown, Farmington Hills, MI (US)

(73) Assignee: GM Global Technology Operations LLC

( * ) Notice: Subject to any disclaimer, the term of this patent is extended or adjusted under 35 U.S.C. 154(b) by 1045 days.

(21) Appl. No.: 12/472,747

(22) Filed: May 27, 2009

(65) Prior Publication Data

US 2010/0305829 A1 Dec. 2, 2010

(51) Int. Cl.
| | |
|---|---|
| B60T 7/12 | (2006.01) |
| G05D 1/00 | (2006.01) |
| G06F 7/00 | (2006.01) |
| G06F 17/00 | (2006.01) |
| F02M 7/00 | (2006.01) |
| F02D 19/08 | (2006.01) |
| F02D 35/02 | (2006.01) |
| F02D 41/00 | (2006.01) |
| F02B 37/00 | (2006.01) |
| F02B 29/04 | (2006.01) |
| F02M 25/07 | (2006.01) |

(52) U.S. Cl.
CPC ........ G02D 13/0219 (2013.01); F02D 41/0025 (2013.01); F02B 37/00 (2013.01); F02B 29/0406 (2013.01); Y02T 10/18 (2013.01); F02D 2200/0612 (2013.01); F02D 19/084 (2013.01); Y02T 10/36 (2013.01); F02M 25/0727 (2013.01); F02D 19/088 (2013.01); F02D 41/009 (2013.01); F02D 35/028 (2013.01)

USPC ......... 701/103; 123/435; 123/436; 123/406.3

(58) Field of Classification Search
USPC ............. 123/406.35, 406.41, 406.42, 406.43, 123/406.3, 435, 436; 701/101, 102, 103, 701/104, 105; 73/114.16, 114.38
See application file for complete search history.

(56) References Cited

U.S. PATENT DOCUMENTS

| | | | | |
|---|---|---|---|---|
| 5,050,555 | A * | 9/1991 | Mitsumoto | ............... 123/406.31 |
| 7,793,536 | B2 * | 9/2010 | Schweinsberg et al. | ... 73/114.55 |
| 7,963,156 | B2 * | 6/2011 | Boerkel | ..................... 73/114.55 |
| 8,032,294 | B2 * | 10/2011 | Loeffler et al. | ................ 701/111 |
| 8,185,293 | B2 * | 5/2012 | Jiang et al. | .................... 701/102 |
| 2002/0078918 | A1 | 6/2002 | Ancimer et al. | |
| 2004/0194758 | A1 * | 10/2004 | Hochstrasser et al. | ... 123/406.26 |

OTHER PUBLICATIONS

Larsson, S. and Andersson, I., "An Experimental Evaluation of Torque Sensor Based Feedback Control of Combustion Phasing in an SI-engine," SAE Technical Paper 2005-01-0060, 2005, 11 pages.

* cited by examiner

Primary Examiner — Mahmoud Gimie
Assistant Examiner — Sizo Vilakazi

(57) ABSTRACT

A combustion control system for a vehicle comprises a position determination module and an ethanol determination module. The position determination module determines a crankshaft angle where a predetermined percentage of a fuel was combusted within a cylinder of an engine during an engine cycle based on one of pressure within the cylinder measured by a cylinder pressure sensor during the engine cycle and torque on a crankshaft measured by a torque sensor during the engine cycle. The ethanol determination module determines an ethanol content of the fuel based on the crankshaft angle.

10 Claims, 6 Drawing Sheets

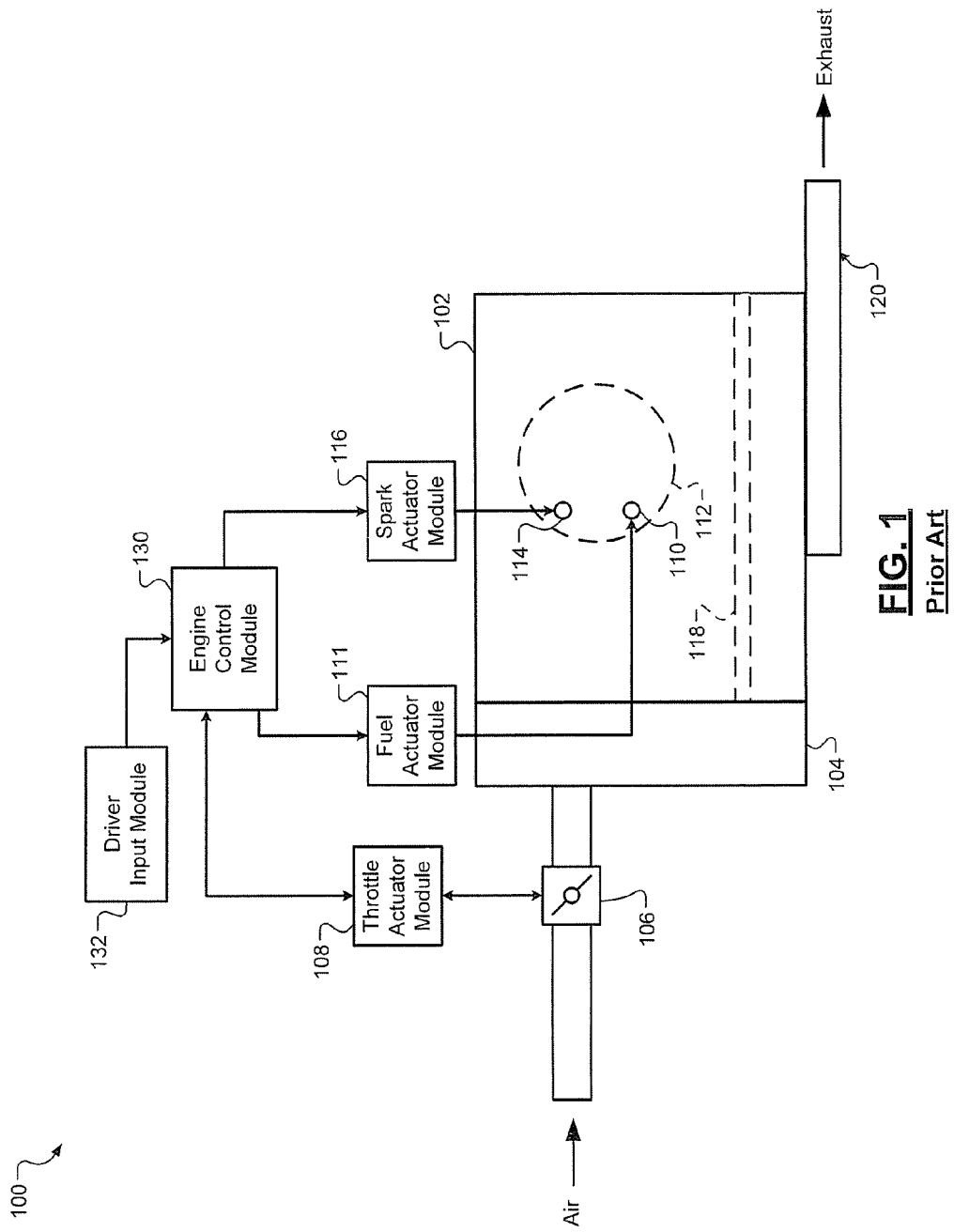

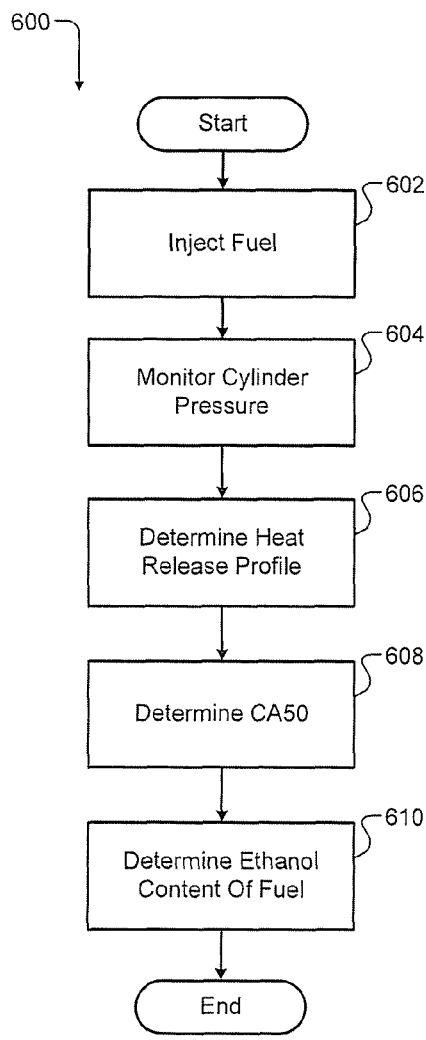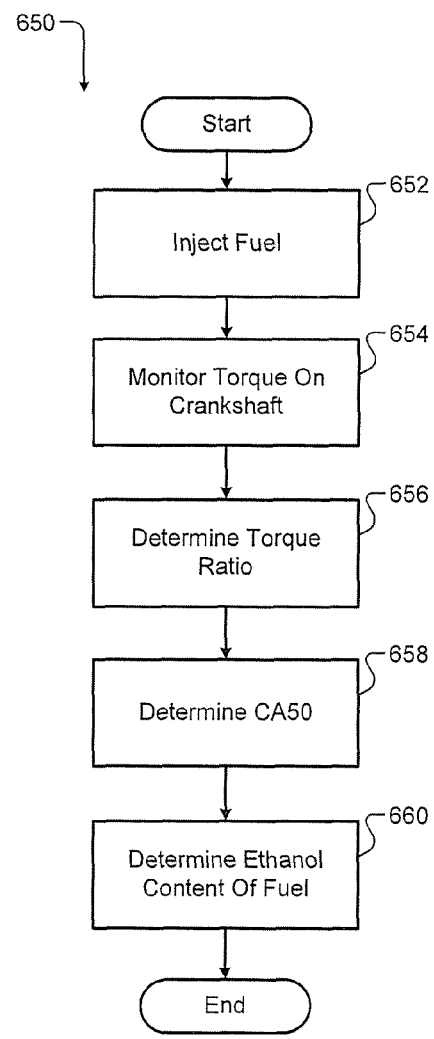
FIG. 6A     FIG. 6B

ETHANOL CONTENT DETERMINATION SYSTEMS AND METHODS

FIELD

The present disclosure relates to internal combustion engines and more particularly to engine control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an engine system 100 is presented. Air is drawn into an engine 102 through an intake manifold 104. A throttle valve 106 controls airflow into the engine 102. A throttle actuator module 108 controls the throttle valve 106 and, therefore, the airflow into the engine 102. The throttle actuator module 108 may include, for example, an electronic throttle controller (ETC). The air mixes with fuel from one or more fuel injectors 110 to form an air/fuel mixture. A fuel actuator module 111 controls the fuel injectors 110.

The air/fuel mixture is combusted within one or more cylinders 112 of the engine 102. Combustion of the air/fuel mixture may be initiated by, for example, injection of the fuel or spark provided by a spark plug 114. In spark ignition engine systems, a spark actuator module 116 controls the spark provided by the spark plug 114.

Combustion of the air/fuel mixture produces torque and exhaust gas. More specifically, torque is generated via heat release and expansion during combustion of the air/fuel mixture within the cylinders. Torque is transferred by a crankshaft 118 of the engine 102 through a driveline (not shown) to one or more wheels to propel a vehicle. The exhaust is expelled from the cylinders to an exhaust system 120.

An engine control module (ECM) 130 controls the torque output of the engine 102. For example, the ECM 130 controls the torque output of the engine 102 based on driver inputs and/or other inputs. A driver input module 132 provides the driver inputs to the ECM 130. The driver inputs may include, for example, accelerator pedal position, brake pedal position, cruise control inputs, and/or other suitable driver inputs. The other inputs may include, for example, inputs from various sensors and/or inputs from other controllers (not shown), such as a transmission control module, a hybrid control module, and a chassis control module.

SUMMARY

A combustion control system for a vehicle comprises a position determination module and an ethanol determination module. The position determination module determines a crankshaft angle where a predetermined percentage of a fuel was combusted within a cylinder of an engine during an engine cycle based on one of pressure within the cylinder measured by a cylinder pressure sensor during the engine cycle and torque on a crankshaft measured by a torque sensor during the engine cycle. The ethanol determination module determines an ethanol content of the fuel based on the crankshaft angle.

In other features, the combustion control module further comprises a heat release module. The heat release module determines a heat release profile for the fuel based on cylinder pressures measured by the cylinder pressure sensor during the engine cycle. The position determination module determines the crankshaft angle based on the heat release profile.

In still other features, the heat release module determines cylinder pressure ratios based on the cylinder pressures and motored cylinder pressures, determines a corresponding heat release value for each of the cylinder pressure ratios, and determines the heat release profile based on the heat release values.

In further features, the combustion control system further comprises a heat release module. The heat release module determines a heat release profile for the fuel based on cylinder pressures measured by the cylinder pressure sensor during the engine cycle and determines a percent heat release value based on the heat release profile. The position determination module determines the crankshaft angle based on the percent heat release value.

In still further features, the combustion control system further comprises a torque ratio determination module. The torque ratio determination module determines torque ratios based on torques measured by the torque sensor during the engine cycle and motored torques for the cylinder. The position determination module determines the crankshaft angle based on the torque ratios.

In other features, the combustion control system further comprises a torque ratio determination module. The torque ratio determination module determines torque ratios based on torques measured by the torque sensor during the engine cycle and motored torques for the cylinder. The torque ratio determination module determines a percent torque ratio based on the torque ratios. The position determination module determines the crankshaft angle based on the percent torque ratio.

In still other features, the torque ratios respectively correspond to predetermined crankshaft angles and each of the torque ratios is equal to a quotient of a measured torque at one of the predetermined crankshaft angles over a motored torque at the one of the predetermined crankshaft angles.

In further features, the combustion control system further comprises a combustion control module. The combustion control module adjusts at least one of a mass of the fuel injected and a spark timing based on the ethanol concentration.

In still further features, the combustion control module adjusts at least one other combustion parameter based on the ethanol concentration.

A combustion control system for a vehicle comprises a position determination module and an ethanol determination module. The position determination module determines a crankshaft angle where a predetermined percentage of a fuel was combusted within a cylinder of an engine during an engine cycle based on pressure within the cylinder measured by a cylinder pressure sensor during the engine cycle. The ethanol determination module determines an ethanol content of the fuel based on the crankshaft angle.

In other features, the combustion control system further comprises a heat release module. The heat release module determines a heat release profile for the fuel based on cylinder pressures measured by the cylinder pressure sensor during the engine cycle. The position determination module determines the crankshaft angle based on the heat release profile.

In still other features, the heat release module determines cylinder pressure ratios based on the cylinder pressures and motored cylinder pressures, determines a corresponding heat release value for each of the cylinder pressure ratios, and determines the heat release profile based on the heat release values.

In further features, the combustion control system further comprises a heat release module. The heat release module determines a heat release profile for the fuel based on cylinder pressures measured by the cylinder pressure sensor during the engine cycle and determines a percent heat release value based on the heat release profile. The position determination module determines the crankshaft angle based on the percent heat release value.

In still further features, the combustion control system further comprises a combustion control module. The combustion control module adjusts at least one of a mass of the fuel injected and a spark timing based on the ethanol concentration.

A combustion control system for a vehicle comprises a position determination module and an ethanol determination module. The position determination module determines a crankshaft angle where a predetermined percentage of a fuel was combusted within a cylinder of an engine during an engine cycle based on torque on a crankshaft measured by a torque sensor during the engine cycle. The ethanol determination module determines an ethanol content of the fuel based on the crankshaft angle.

In other features, the combustion control system further comprises a torque ratio determination module. The torque ratio determination module determines torque ratios based on torques measured by the torque sensor during the engine cycle and motored torques for the cylinder. The position determination module determines the crankshaft angle based on the torque ratios.

In still other features, the combustion control system further comprises a torque ratio determination module. The torque ratio determination module determines torque ratios based on torques measured by the torque sensor during the engine cycle and motored torques for the cylinder. The torque ratio determination module determines a percent torque ratio based on the torque ratios. The position determination module determines the crankshaft angle based on the percent torque ratio.

In further features, the torque ratios respectively correspond to predetermined crankshaft angles and wherein each of the torque ratios is equal to a quotient of a measured torque at one of the predetermined crankshaft angles over a motored torque at the one of the predetermined crankshaft angles.

In still further features, the combustion control system further comprises a combustion control module. The combustion control module adjusts at least one of a mass of the fuel injected and a spark timing based on the ethanol concentration.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a functional block diagram of an engine system according to the prior art;

FIGS. 6A-6B are flowcharts depicting exemplary methods according to the principles of the present disclosure.

DETAILED DESCRIPTION

Figure 2A:
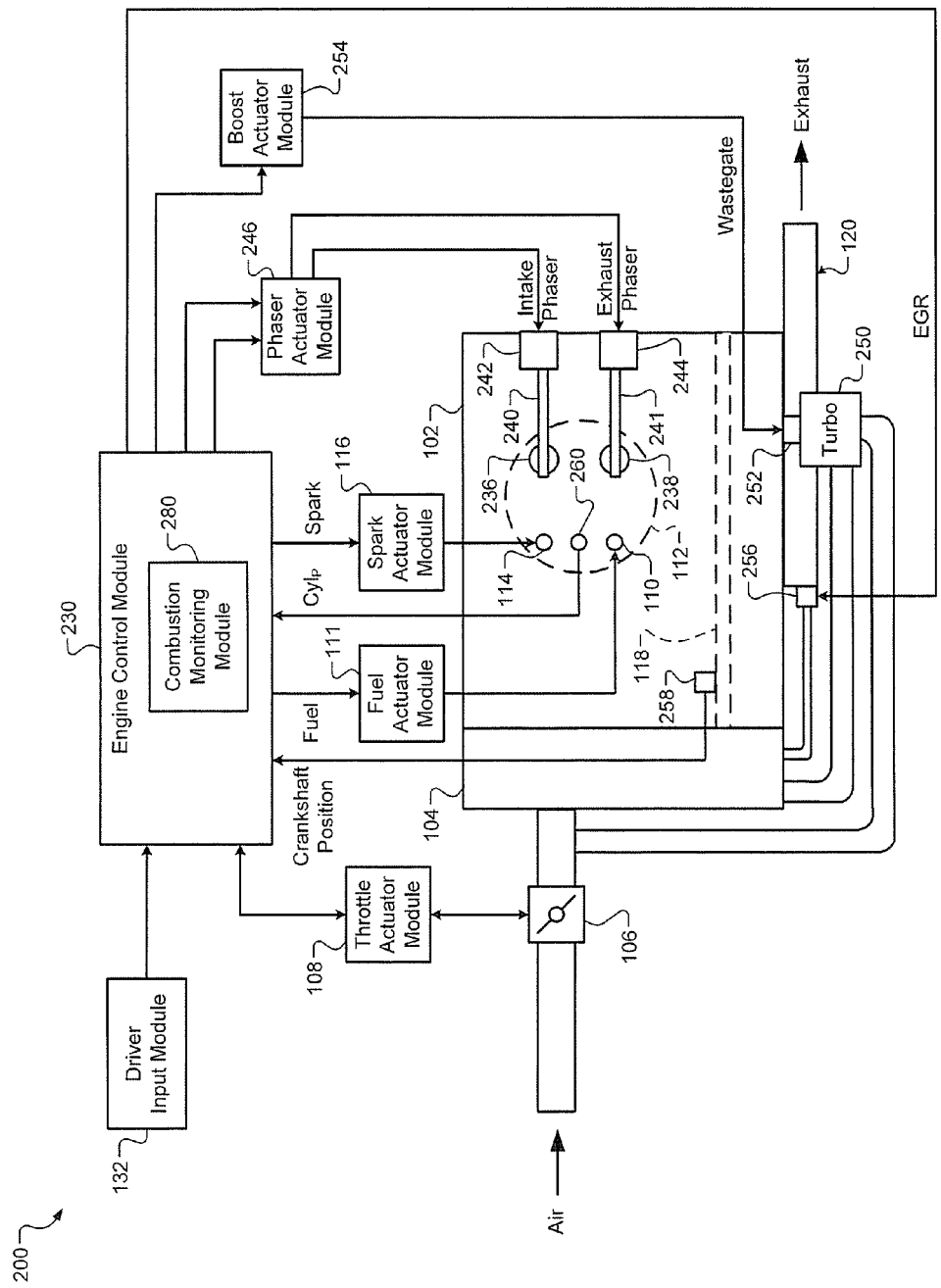
FIGS. 2A-2B are a functional block diagrams of exemplary engine systems according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An internal combustion engine combusts an air/fuel mixture to generate drive torque. The fuel may include unleaded gasoline. In some vehicles, however, alternative types of fuel may also be combusted. For example, flex-fuel vehicles are capable of combusting mixtures of E85 fuel and unleaded gasoline. E85 fuel includes a mixture of ethanol and gasoline. The ethanol content of the fuel (e.g., percentage) may affect the combustion of the air/fuel mixture.

An engine control module according to the present disclosure determines a predetermined amount of fuel for combustion within a cylinder of the engine. The ECM determines a crankshaft angle where a predetermined percentage (e.g., fifty percent) of the fuel was combusted. The crankshaft angle where fifty percent of the fuel was combusted is referred to as CA50.

The ECM determines the ethanol content of the fuel based on the CA50. Based on the ethanol content of the fuel, one or more combustion parameters may be selectively adjusted to minimize emissions and fuel consumption. In one implementation, the ECM determines the CA50 based on cylinder pressure measured by a cylinder pressure during combustion of the fuel. In another implementation, the ECM determines the CA50 based on torque on a crankshaft measured by a torque sensor during combustion of the fuel.

Figure 2B:
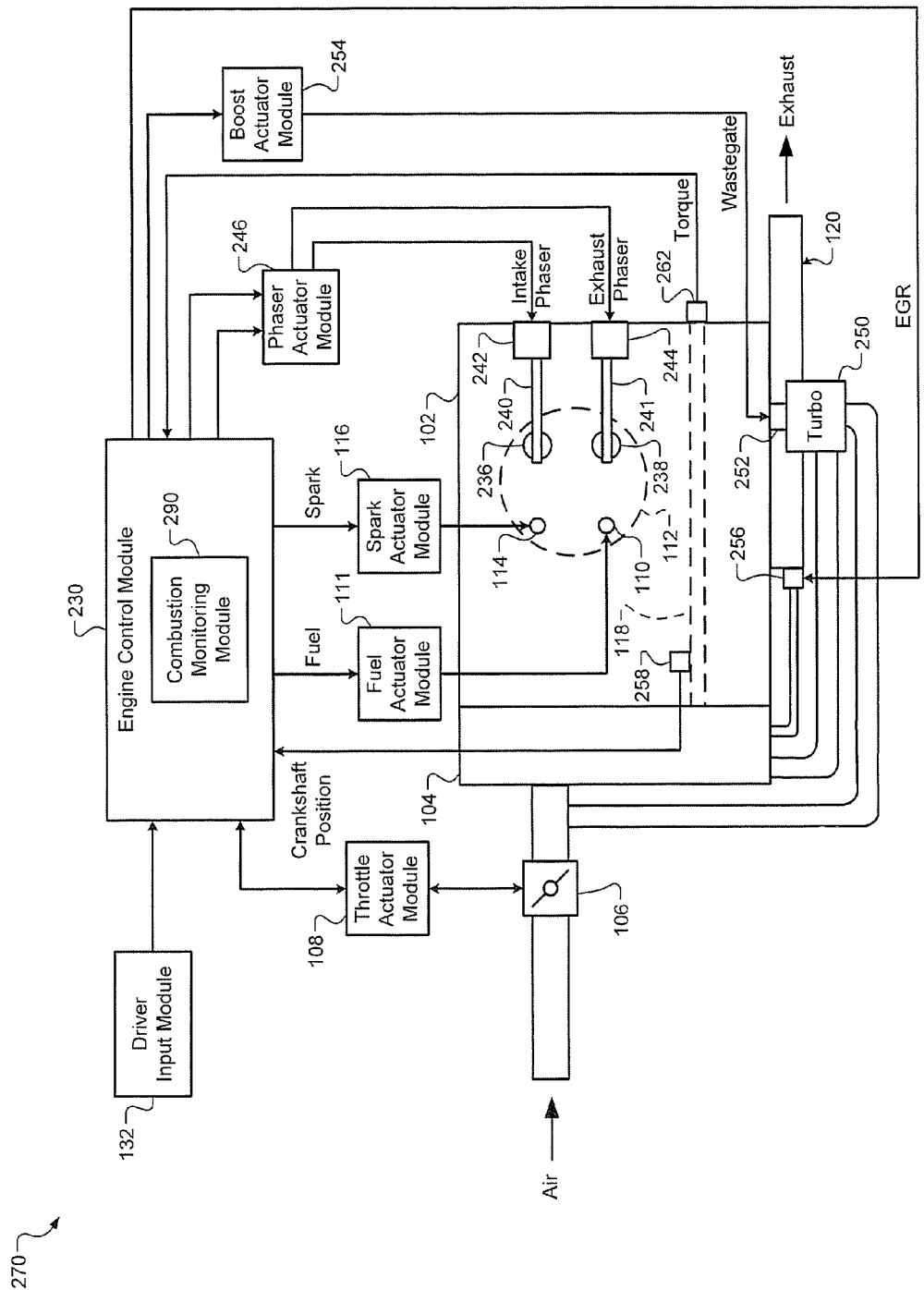

Referring now to FIGS. 2A-2B, functional block diagrams of exemplary engine systems 200 and 270 are presented. The engine systems 200 and 270 include the engine 102 that combusts an air/fuel mixture to produce drive torque. Air is drawn into the intake manifold 104 through the throttle valve 106. The throttle actuator module 108 controls opening of the throttle valve 106 and, therefore, airflow into the engine 102.

Air from the intake manifold 104 is drawn into cylinders of the engine 102. While the engine 102 may include multiple cylinders, for illustration purposes only, only the single representative cylinder 112 is shown. For example only, the engine 102 may include 1, 2, 3, 4, 5, 6, 8, 10, and/or 12 cylinders.

Air from the intake manifold 104 is drawn into the cylinder 112 through an associated intake valve 236. An engine control module (ECM) 230 controls the amount (e.g., mass) of fuel injected by the fuel injector 110 and the timing of the injection of fuel. More specifically, the fuel actuator module 111 controls opening of the fuel injector 110 based on signals from the ECM 230.

The fuel injector 110 may inject fuel directly into the cylinder 112 as shown in FIGS. 2A-2B. In other implementations, the fuel injector 110 may inject fuel into the intake manifold 104 at a central location or may inject fuel into the intake manifold 104 at multiple locations, such as near the intake valve of each of the cylinders. The injected fuel mixes with the air and creates the air/fuel mixture.

A piston (not shown) within the cylinder 112 compresses the air/fuel mixture within the cylinder 112. Based upon signals from the ECM 230, the spark actuator module 116 energizes the spark plug 114, which initiates combustion of the air/fuel mixture. In other engine systems, the spark plug 114 may not be necessary to initiate combustion. The spark timing may be specified relative to the time when the piston is at its topmost position, referred to as to top dead center (TDC), the point at which the air/fuel mixture is most compressed.

Combustion of the air/fuel mixture drives the piston down, and the piston drives the crankshaft 118 rotationally. The piston drives the crankshaft 118 down until the piston reaches a bottommost position, referred to as to bottom dead center (BDC). The piston then begins moving up again and expels the byproducts of combustion through an associated exhaust valve 238. The byproducts of combustion are exhausted from the vehicle via the exhaust system 120.

The intake valve 236 is controlled by an intake camshaft 240, and the exhaust valve 238 is controlled by an exhaust camshaft 241. In other implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

An intake cam phaser 242 controls the intake camshaft 240 and, therefore, controls opening (e.g., lift, timing, and duration) of the intake valve 236. Similarly, an exhaust cam phaser 244 controls the exhaust camshaft 241 and, therefore, controls opening (e.g., lift, timing, and duration) of the exhaust valve 238. The timing of the opening of the intake and exhaust valves 236 and 238 may be specified relative to, for example, the TDC position or the BDC position. A phaser actuator module 246 controls the intake cam phaser 242 and the exhaust cam phaser 244 based on signals from the ECM 230.

The engine systems 200 and 270 may also include a boost device that provides pressurized air to the intake manifold 104. For example only, FIGS. 2A-2B depicts a turbocharger 250. The turbocharger 250 is powered by exhaust gases flowing through the exhaust system 120, and provides a compressed air charge to the intake manifold 104. The turbocharger 250 may include a variable geometry turbo (VGT) or another suitable type of turbocharger.

A wastegate 252 selectively allows exhaust gas to bypass the turbocharger 250, thereby reducing the turbocharger's output (or boost). The ECM 230 controls boost of the turbocharger 250 via a boost actuator module 254. The boost actuator module 254 may modulate the boost of the turbocharger 250 by, for example, controlling the position of the wastegate 252 or the turbocharger 250 itself (e.g., vanes).

An intercooler (not shown) may be implemented to dissipate some of the compressed air charge's heat. This heat may be generated when the air is compressed. Another source of heat is the exhaust system 120. Other engine systems may include a supercharger that provides compressed air to the intake manifold 104 and is driven by the crankshaft 118.

The engine systems 200 and 270 may also include an exhaust gas recirculation (EGR) valve 256, which selectively redirects exhaust gas back to the intake manifold 104. While the EGR valve 256 is shown in FIGS. 2A-2B as being located upstream of the turbocharger 250, the EGR valve 256 may be located downstream of the turbocharger 250. An EGR cooler (not shown) may also be implemented to cool the redirected exhaust gas before the exhaust gas is provided to the intake manifold 104.

The ECM 230 regulates the torque output of the engine 102 based on driver inputs and other inputs. The driver inputs may include, for example, accelerator pedal position, brake pedal position, cruise control inputs, and/or other suitable driver inputs. The other inputs may include, for example, inputs from various sensors and/or inputs from other controllers (not shown), such as a transmission control module, a hybrid control module, and a chassis control module.

The ECM 230 receives a crankshaft position signal from a crankshaft sensor 258 based on position of the crankshaft 118. The crankshaft position signal may be used to determine the rotational speed of the crankshaft 118 (i.e., the engine speed) in revolutions per minute (rpm).

For example only, the crankshaft sensor 258 may include a variable reluctance (VR) sensor or another suitable type of crankshaft sensor. The crankshaft position signal may include a pulse train. Each pulse of the pulse train may be generated as a tooth of an N-toothed wheel (not shown) that rotates with the crankshaft 118, passes the VR sensor. Accordingly, each pulse corresponds to an angular rotation of the crankshaft 118 by an amount equal to 360° divided by N teeth. The N-toothed wheel may also include a gap of one or more missing teeth, and the gap may be used as an indicator of one complete rotation of the crankshaft 118.

The ECM 230 may also receive signals from other sensors, such as an engine coolant temperature sensor, a manifold absolute pressure (MAP) sensor, a mass air flow (MAF) sensor, a throttle position sensor, an intake air temperature (IAT) sensor, and/or other suitable sensors. The ECM 230 of FIG. 2A receives a cylinder pressure signal ($Cyl_P$) from a cylinder pressure sensor 260.

The cylinder pressure sensor 260 measures pressure within the cylinder 112 and generates the cylinder pressure signal accordingly. While only the single representative cylinder pressure sensor 260 is shown, one or more cylinder pressure sensors may be provided. For example only, one or more cylinder pressure sensors may be provided for each cylinder of the engine 102. The cylinder pressure sensor 260 may be implemented independently or in association with another component, such as the spark plug 114.

The ECM 230 of FIG. 2B receives a torque signal from a torque sensor 262. The torque sensor 262 measures torque on the crankshaft 118 and generates the torque signal accordingly. The torque sensor 262 may include a surface acoustic torque sensor, a magneto-elastic torque sensor, and/or another suitable type of torque sensor.

The engine system 200 includes a combustion monitoring module 280 according to the principles of the present disclosure. The engine system 270 includes a combustion monitoring module 290 according to the principles of the present disclosure. While the combustion monitoring modules 280 and 290 are shown as being located within the ECM 230, the combustion monitoring modules 280 and 290 may be located in another suitable location, such as external to the ECM 230.

The combustion monitoring module 280 determines an ethanol content of fuel combusted within the cylinder 112 based on cylinder pressure measured by the cylinder pressure sensor 260. The combustion monitoring module 290 determines an ethanol content of fuel combusted within the cylinder 112 based on torque on the crankshaft 118 measured by the torque sensor 262. Based on the ethanol content of the fuel, one or more combustion parameters may be selectively adjusted to, for example, minimize emissions and maximize fuel efficiency.

Figure 3A:
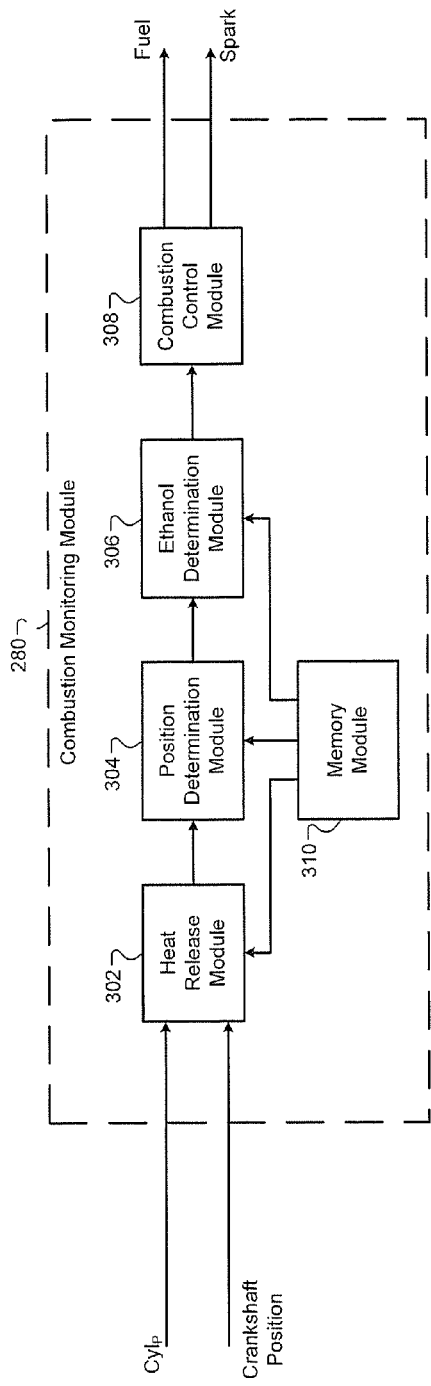
FIGS. 3A-3B are functional block diagrams of exemplary combustion monitoring modules according to the principles of the present disclosure.

Referring now to FIG. 3A, a functional block diagram of an exemplary implementation of the combustion monitoring module 280 is presented. The combustion monitoring module 280 includes a heat release module 302, a position determination module 304, and an ethanol determination module 306. The combustion monitoring module 280 may also include a combustion control module 308 and a memory module 310.

The heat release module 302 determines a heat release profile for the fuel combusted within the cylinder 112 based on cylinder pressures at various crankshaft positions. More specifically, the heat release module 302 determines the heat release profile based on heat release values at predetermined crankshaft positions (i.e., angles). Each heat release value corresponds to a cylinder pressure ratio at crankshaft angle.

The pressure ratio at a given crankshaft angle corresponds to a measured cylinder pressure at the given crankshaft angle divided by a motored cylinder pressure at that crankshaft angle. The crankshaft angle is provided by the crankshaft sensor 258. The measured cylinder pressure corresponds to the cylinder pressure measured by the cylinder pressure sensor 260. The motored cylinder pressure corresponds to an expected cylinder pressure at the crankshaft angle when combustion is not occurring (i.e., when the cylinder 112 is not being fired). The motored cylinder pressure may be obtained from a lookup table or determined theoretically.

For example only, the memory module 310 may include a mapping of cylinder pressures indexed by crankshaft angle, where the cylinder pressures were calibrated when the engine 102 was motored. The motored cylinder pressure may be obtained from the memory module 310 based on the crankshaft angle. The motored cylinder pressure may be determined theoretically using, for example, the equation:

$$P_{Motored} = P_1 * (V_1/V)^\gamma = P_1 * CR^\gamma,$$

where $P_1$ is a previous cylinder pressure, $V_1$ is a previous volume of the cylinder 112, V is the current volume of the cylinder 112, CR is a compression ratio, and $\gamma$ is a specific heat ratio. The volume of the cylinder 112 may be determined based on the crankshaft angle. The specific heat ratio may be a constant value, such as 1.32 for gasoline-type engine systems. In other implementations, the specific heat ratio may be determined from a lookup table of specific heat ratios indexed by crankshaft angle.

The heat release module 302 determines the heat release values corresponding to each of the pressure ratios. The heat release values may be obtained from a mapping of heat release value indexed by pressure ratio. The mapping may be stored in, for example, the memory module 310. The heat release module 302 may determine the heat release profile for the fuel based on a predetermined number of the heat release values. For example only, the heat release profile may be determined based on three or more heat release values obtained over one engine cycle, where one engine cycle corresponds to two revolutions (i.e., 720°) of the crankshaft 118.

Based on the predetermined number of the heat release values (e.g., three), a fifty percent heat release value (HR50) may also be determined. The HR50 corresponds to the crankshaft angle where the heat release value increased half way (i.e., 50%) from a minimum heat release value to a maximum heat release value. The minimum and maximum heat release values may correspond to the heat release value at a first crankshaft angle near the beginning of combustion of the fuel (e.g., 20° before TDC) and a second crankshaft angle near the end of the combustion (e.g., 20° after TDC), respectively. The third heat release value used to determine the HR50 may correspond to the heat release value when the piston is in the TDC position. In other implementations, another percentage heat release value may instead be determined, such as a ten, thirty, seventy, or ninety percent heat release value.

The position determination module 304 determines a crankshaft position (i.e., angle) where fifty percent (50%) of the fuel was consumed within the cylinder 112. The crankshaft angle where fifty percent of the fuel was consumed is referred to as CA50. The position determination module 304 determines the CA50 for the fuel based on the heat release profile. In another implementation, the position determination module 304 determines the CA50 based on the HR50. For example only, the position determination module 304 may determine the CA50 from a mapping of CA50 indexed by HR50. Such a mapping may be stored in, for example, the memory module 310.

Figure 4:
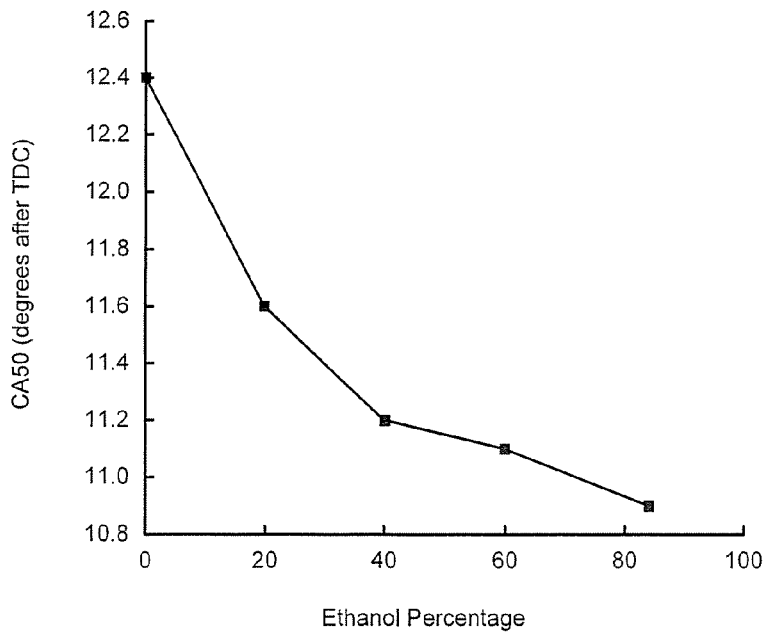
FIG. 4 is a graph depicting an exemplary relationship between crankshaft angle at which fifty percent of an injected amount of fuel is combusted (CA50) and ethanol content of the fuel according to the principles of the present disclosure.

The ethanol determination module 306 determines an ethanol content (e.g., percentage) of the fuel based on the CA50. For example only, the ethanol determination module 306 may determine the ethanol content from a mapping of ethanol content indexed by CA50. Such a mapping may be stored in, for example, the memory module 310 and the relationship between ethanol content and CA50 may resemble the relationship shown in FIG. 4. FIG. 4 depicts an exemplary graph of CA50 versus ethanol percentage for fuel. As shown in FIG. 4, ethanol percentage of a given fuel increases as the CA50 of the fuel approaches the TDC position.

The combustion control module 308 selectively adjusts one or more combustion parameters based on the ethanol content of the fuel. For example only, the combustion control module 308 may adjust the amount of fuel injected (e.g., mass), the timing of injection of the fuel, and/or the spark timing. Adjusting the spark timing may be done to, for example, adjust the crankshaft angle at which predetermined amounts of injected fuel (e.g., 10% and/or 50%) are combusted.

The combustion control module 308 may also adjust other combustion parameters, such as boost of the boost device, opening of the EGR valve 256, opening of the intake valve 236, and/or opening of the exhaust valve 238. Determining the ethanol content of injected fuel and adjusting combustion parameters based on the ethanol content minimizes emissions and maximizes fuel economy in flex-fuel vehicles.

Figure 3B:
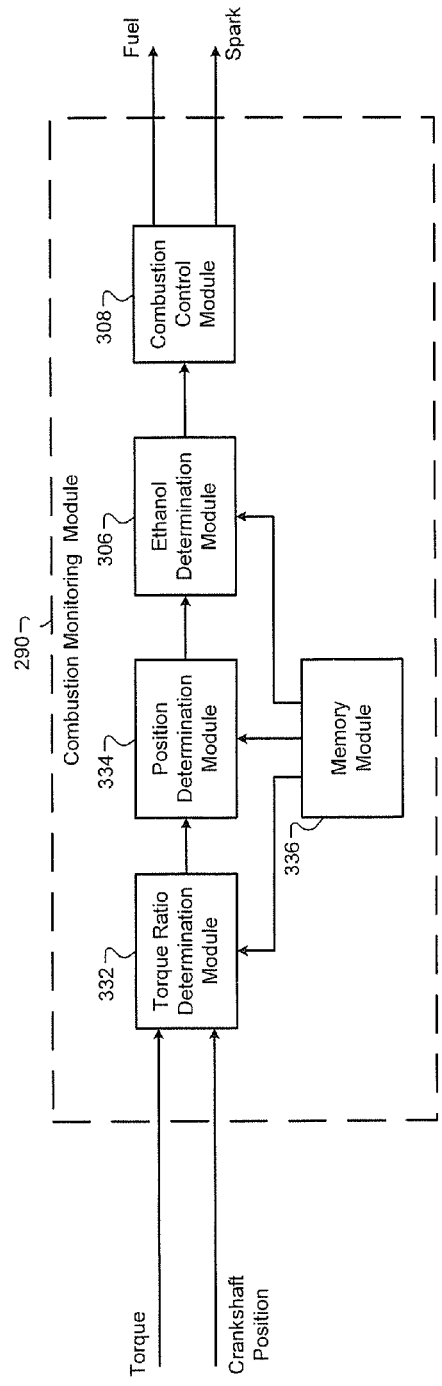

Referring now to FIG. 3B, a functional block diagram of an exemplary implementation of the combustion monitoring module 290 is presented. The combustion monitoring module 290 includes the ethanol determination module 306 and the combustion control module 308. The combustion monitoring module 290 also includes a torque ratio determination module 332, a position determination module 334, and a memory module 336.

The torque ratio determination module 332 determines torque ratios for the fuel combusted within the cylinder 112 based on torque on the crankshaft 118 at various crankshaft angles. More specifically, the torque ratio determination module 332 determines torque ratios based on torques at predetermined crankshaft angles. The torque ratio at a predetermined crankshaft angle corresponds to a measured torque at the crankshaft angle divided by a motored torque at the crankshaft angle. The crankshaft angle is provided by the crankshaft sensor 258.

The measured torque is the torque measured by the torque sensor 262. The motored torque corresponds to an expected torque at the crankshaft angle when combustion is not occurring (i.e., when the cylinder 112 is not being fired). For example only, the torque ratio determination module 332 may determine the motored torque from a mapping of motored torque indexed by crankshaft angle. Such a mapping may be stored in, for example, the memory module 336.

Based on a predetermined number of the torque ratios (e.g., three), the torque ratio determination module 332 may also determine a fifty percent torque ratio (TR50). The TR50 corresponds to the crankshaft angle where the torque ratio has increased half way (i.e., 50%) from a minimum torque ratio to a maximum torque ratio. The minimum and maximum torque ratios may correspond to the torque ratio at a first crankshaft angle near the beginning of combustion of the fuel (e.g., 20° before TDC) and a second crankshaft angle near the end of the combustion (e.g., 20° after TDC), respectively. The third torque ratio used to determine the TR50 may correspond to the torque ratio when the piston is in the TDC position. In other implementations, another percentage torque ratio value may instead be determined, such as a ten, thirty, seventy, or ninety percent torque ratio value.

Figure 5:
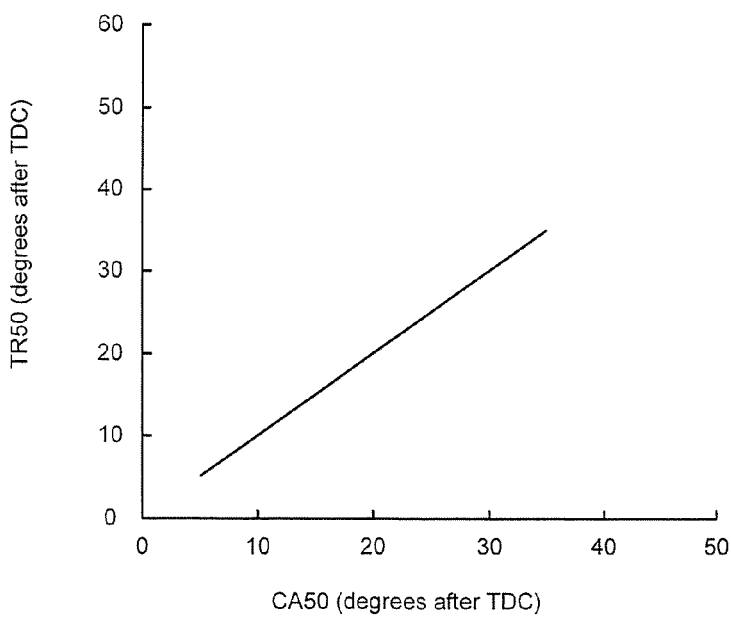
FIG. 5 is a graph depicting an exemplary relationship between torque ratio and CA50 of a combusted fuel according to the principles of the present disclosure.

The position determination module 334 determines the CA50 for the fuel based on one or more of the torque ratios. For example only, the position determination module 334 may determine the CA50 for the fuel based on a predetermined number of torque ratios obtained over one engine cycle or the TR50. The position determination module 334 may determine the CA50 from a mapping of CA50 indexed by torque ratio. Such a mapping may be stored in, for example, the memory module 336 and the relationship between torque ratio and CA50 may resemble the relationship shown in FIG. 5. FIG. 5 depicts an exemplary graph of TR50 versus CA50 for a given fuel. As shown in FIG. 5, CA50 for a given fuel approaches the TDC position as the TR50 of the fuel approaches the TDC position.

The ethanol determination module 306 determines the ethanol content (e.g., percentage) of the fuel based on the CA50. For example only, the ethanol determination module 306 may determine the ethanol content from a mapping of ethanol content indexed by CA50. Such a mapping may be stored in, for example, the memory module 336 and the relationship between ethanol content and CA50 may resemble the relationship shown in FIG. 4. The combustion control module 308 selectively adjusts one or more of the combustion parameters based on the ethanol content of the fuel.

Referring now to FIG. 6A, a flowchart depicting an exemplary method 600 performed by the combustion monitoring module 280 is presented. The method 600 begins in step 602 where the method 600 injects fuel. In this manner, fuel is provided to a cylinder for combustion. The method 600 monitors the cylinder pressure measured by the cylinder pressure in step 604. The method 600 also determines the pressure ratios based on measured cylinder pressures at predetermined crankshaft angles and motored cylinder pressures at those predetermined crankshaft angles. Each pressure ratio corresponds to a heat release value.

The method 600 determines the heat release profile in step 606. The method 600 may determine the heat release profile based on a predetermined number of heat release values that correspond to the pressure ratios, such as three or more heat release values. The method 600 may also determine the HR50 for the fuel in step 606.

The method 600 determines the CA50 for the fuel in step 608. The method 600 determines the CA50 based on the heat release profile or the HR50. The method 600 determines the ethanol content of the fuel (e.g., percentage) in step 610. The method 600 determines the ethanol content of the fuel based on the CA50 of the fuel. In this manner, the method 600 determines the ethanol content based on the cylinder pressures measured by the cylinder pressure sensor 260. The method 650 then ends.

Referring now to FIG. 6B, a flowchart depicting an exemplary method 650 performed by the combustion monitoring module 290 is presented. The method 650 begins in step 652 where the method 650 injects fuel. In this manner, fuel is provided to a cylinder for combustion. In step 654, the method 650 monitors torque measured by the torque sensor 262. In other words, the method 650 monitors torque on the crankshaft 118 measured during combustion of the fuel.

The method 650 determines a torque ratio in step 656. The method 650 determines the torque ratio for a predetermined crankshaft angle based on the measured torque at the crankshaft angle divided by the motored torque at the crankshaft angle. In other implementations, the method 650 determines more than one torque ratio for more than one crankshaft angle in step 656, which may be used to determine the TR50 for the fuel.

The method 650 determines the CA50 for the fuel in step 658. The method 650 determines the CA50 for the fuel based on one or more of the torque ratios or the TR50. The method 650 determines the ethanol content (e.g., percentage) of the fuel in step 660. The method 650 determines the ethanol content of the fuel based on the CA50. In this manner, the method 650 determines the ethanol content of the fuel based on the torque on the crankshaft 118 measured by the torque sensor 262. The method 650 then ends.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A combustion control system for a vehicle, comprising:
a position determination module that is configured to determine a crankshaft angle where a predetermined percentage of a fuel was combusted within a cylinder of an engine during an engine cycle based on pressure within said cylinder measured by a cylinder pressure sensor during said engine cycle;
heat release module that is configured to determine a heat release profile for said fuel based on cylinder pressures measured by said cylinder pressure sensor during said engine cycle,
wherein said position determination module is configured to determine said crankshaft angle based on said heat release profile; and
an ethanol determination module that is configured to determine an ethanol content of said fuel based on said crankshaft angle.

2. The combustion control system of claim 1 wherein said heat release module is configured to determine cylinder pressure ratios based on said cylinder pressures and motored cylinder pressures, determine a corresponding heat release value for each of said cylinder pressure ratios, and determine said heat release profile based on said heat release values.

3. The combustion control system of claim 1 wherein said heat release module is configured to determine a percent heat release value based on said heat release profile, wherein said position determination module is configured to determine said crankshaft angle based on said percent heat release value.

4. The combustion control system of claim 1 further comprising a combustion control module that is configured to adjust at least one of a mass of said fuel injected and a spark timing based on said ethanol concentration.

5. A combustion control system for a vehicle, comprising:
a position determination module that is configured to determine a crankshaft angle where a predetermined percentage of a fuel was combusted within a cylinder of an engine during an engine cycle based on torque on a crankshaft measured by a torque sensor during said engine cycle;
an ethanol determination module that is configured to determine an ethanol content of said fuel based on said crankshaft angle; and
a torque ratio determination module that is configured to determine torque ratios based on torques measured by said torque sensor during said engine cycle and motored torques for said cylinder,
wherein said position determination module is configured to determine said crankshaft angle based on said torque ratios.

6. The combustion control system of claim 5 wherein said torque ratios respectively correspond to predetermined crankshaft angles and wherein each of said torque ratios is equal to a quotient of a measured torque at one of said predetermined crankshaft angles over a motored torque at said one of said predetermined crankshaft angles.

7. The combustion control system of claim 5 further comprising a combustion control module that is configured to adjust at least one of a mass of said fuel injected and a spark timing based on said ethanol concentration.

8. A combustion control system for a vehicle, comprising:
a position determination module that is configured to determine a crankshaft angle where a predetermined percentage of a fuel was combusted within a cylinder of an engine during an engine cycle based on torque on a crankshaft measured by a torque sensor during said engine cycle;
an ethanol determination module that is configured to determine an ethanol content of said fuel based on said crankshaft angle; and
a torque ratio determination module that is configured to determine torque ratios based on torques measured by said torque sensor during said engine cycle and motored torques for said cylinder and determine a percent torque ratio based on said torque ratios,
wherein said position determination module is configured to determine said crankshaft angle based on said percent torque ratio.

9. The combustion control system of claim 8 wherein said torque ratios respectively correspond to predetermined crankshaft angles and wherein each of said torque ratios is equal to a quotient of a measured torque at one of said predetermined crankshaft angles over a motored torque at said one of said predetermined crankshaft angles.

10. The combustion control system of claim 8 further comprising a combustion control module that is configured to adjust at least one of a mass of said fuel injected and a spark timing based on said ethanol concentration.

* * * * *